US009560913B2

(12) United States Patent
Scharing

(10) Patent No.: US 9,560,913 B2
(45) Date of Patent: Feb. 7, 2017

(54) OPERATOR DESK WITH ADAPTIVE ARMATURE

(71) Applicant: CGM GROUP AB, Boras (SE)

(72) Inventor: Pierre Scharing, Boras (SE)

(73) Assignee: ABB AB, Västerås (SE)

( * ) Notice: Subject to any disclaimer, the term of this patent is extended or adjusted under 35 U.S.C. 154(b) by 78 days.

(21) Appl. No.: 14/442,190

(22) PCT Filed: Nov. 11, 2013

(86) PCT No.: PCT/SE2013/051327
§ 371 (c)(1),
(2) Date: May 12, 2015

(87) PCT Pub. No.: WO2014/077763
PCT Pub. Date: May 22, 2014

(65) Prior Publication Data
US 2016/0270528 A1    Sep. 22, 2016

(30) Foreign Application Priority Data
Nov. 13, 2012  (SE) ...................................... 1230122

(51) Int. Cl.
G06F 1/16       (2006.01)
A47B 83/00      (2006.01)
(Continued)

(52) U.S. Cl.
CPC ........... A47B 83/001 (2013.01); A47B 81/062 (2013.01); A47B 87/002 (2013.01); F21V 23/007 (2013.01);
(Continued)

(58) Field of Classification Search
CPC ... A47B 83/001; A47B 81/062; A47B 87/002; F21V 23/007; F21V 33/0056; G06F 1/1607
(Continued)

(56) References Cited

U.S. PATENT DOCUMENTS 5,347,431 A   9/1994  Blackwell et al.
7,048,417 B1  5/2006  Faure
(Continued)

FOREIGN PATENT DOCUMENTS

DE  202009011499 U1  1/2010
EP        0857027       8/1998
(Continued)

OTHER PUBLICATIONS

STIC Search Report.*
(Continued)

Primary Examiner — Dion R Ferguson
Assistant Examiner — Mandeep S Buttar
(74) Attorney, Agent, or Firm — Young & Thompson

(57) ABSTRACT

The operator desk includes at least one work top having one main work surface with a longitudinal main extension. The work top is attached by at least one leg arrangement extending between the desk top and a base foundation; at least one first set of display monitors arranged on a mount supported by at least two supporting legs and having one lower side facing towards, and one upper side facing away from the base foundation. The supporting legs with adhering first set of monitors are movable along a first extension. The operator desk further includes at least one light-emitting element contained in a casing attached to the upper side by at least one mounting arm. A central control device adjusts the mounting arm so that the light-emitting element maintains a desired position along the first extension when the support- (Continued)

ing legs with adhering display monitors are moved along the first extension.

13 Claims, 4 Drawing Sheets

(51) Int. Cl.
*A47B 87/00* (2006.01)
*A47B 81/06* (2006.01)
*F21V 23/00* (2015.01)
*F21V 33/00* (2006.01)
*F21Y 101/02* (2006.01)

(52) U.S. Cl.
CPC ......... *F21V 33/0056* (2013.01); *G06F 1/1607* (2013.01); *F21Y 2101/02* (2013.01)

(58) Field of Classification Search
USPC .......................... 361/679.22; 108/147, 50.1
See application file for complete search history.

(56) References Cited

U.S. PATENT DOCUMENTS

| | | | |
|---|---|---|---|
| 8,051,782 B2* | 11/2011 | Nethken | A47B 21/02 108/50.01 |
| 8,893,628 B2* | 11/2014 | McKenzie, III | A47B 21/02 108/50.01 |
| 2004/0194669 A1 | 10/2004 | Forslund et al. | |
| 2011/0051435 A1 | 3/2011 | Pfund et al. | |

FOREIGN PATENT DOCUMENTS

| | | |
|---|---|---|
| EP | 1364596 A1 | 11/2003 |
| EP | 1886597 | 2/2008 |
| EP | 2290280 A2 | 3/2011 |

OTHER PUBLICATIONS

Extended European Search Report in corresponding European Appln. No. 13854676, dated May 25, 2016.
International Search Report, dated Mar. 4, 2014, from corresponding PCT application.

* cited by examiner

OPERATOR DESK WITH ADAPTIVE ARMATURE

TECHNICAL FIELD

The present invention relates to an operator desk comprising at least one work top which has one main work surface with a longitudinal main extension. The work top is attached to at least one leg arrangement extending between the work top and a base foundation on which the operator desk is intended to be placed. The operator desk further comprises at least one first set of display monitors arranged on a display monitor mount which is supported by at least two supporting legs and has a lower side facing towards the base foundation, an upper side facing away from the base foundation, as well as connecting sides connecting the lower side and the upper side. The supporting legs with adhering first set of display monitors are arranged to be movable along a first extension, where the operator desk further comprises at least one light-emitting means and a central control device.

BACKGROUND

Control rooms and operations rooms are frequently exacting and critical environments in which operators work 24 hours a day, each with multiple display monitors displaying a great deal of information which has to be interpreted to obtain the correct situation status. Each operator needs to be aware of the incoming information flow and should be able to gain immediate access to important information. Moreover, work tools should be easily accessible.

Obtaining a correct picture in both calm and critical situations places stringent demands on the working environment. This is obviously particularly important when things start to go wrong, such as in a critical situation, when it is essential that the operator in question makes the right decision and interprets all information correctly in the shortest possible time, and implements measures to return the critical situation to normal operating status.

While terminology differs between the process industry and monitoring, the importance of ensuring operators are alert when faced with a critical situation is a common need. Another common factor that operators in the aforementioned environments share is that for the vast majority of the time the status will be normal. Operator work during normal situations can frequently induce fatigue, which is a common occurrence and a well-known fact. When faced with a critical situation, it is essential that each operator is proactive and able to react quickly and correctly.

In a critical situation, a great deal of information appears on the various display monitors and it is important that functions and the technical workstation, usually known as the operator desk, are fit for purpose. The operator desk is a very important workstation: increasing the level of operator alertness and pro-activity involves considerable financial savings for the industry. Occasionally, a process can be salvaged or an accident prevented/minimized by understanding and correct management from the operator at key moments. Consequently, it is important to receive stimulation to maintain alertness and a short reaction time for various events that require measures to be taken. In nuclear power stations, for example, it is extremely important that on-duty operators are as observant and alert as possible so that important events are noticed without unnecessary delay and are managed correctly.

In order to obtain a good working environment, good lighting and acoustics are an important part, as well as a correct relationship to display monitors. In this context, it is frequently desirable to obtain a controlled light field that illuminates the operator desk, but does not create glare in display monitors, a subject that is addressed in the document U.S. Pat. No. 4,920,458.

Flat loudspeaker panels with a directional sound field can be used to allow an operator to e.g. listen to music or for directional messages regarding process events, monitoring or external communication, without disturbing nearby operators.

The working environment should preferably be customized for the current operator and today there is a need for simple adaptation of multiple parameters, in which a correct light field and, where appropriate, correct sound field should be maintained.

SUMMARY

The object of the present invention is to provide an operator desk that provides an operator in a control room or operations room containing multiple display monitors with a simplified means of adapting multiple parameters, in which a correct light field and, where appropriate, a correct sound field are maintained.

This object is achieved by means of an operator desk comprising at least one work top which has one main work surface with a longitudinal main extension. The work top is attached to at least one leg arrangement extending between the desk top and a base foundation on which the operator desk is intended to be placed. The operator desk further comprises at least one first set of display monitors arranged on a display monitor mount which is supported by at least two supporting legs and has a lower side facing towards the base foundation, an upper side facing away from the base foundation, as well as connecting sides connecting the lower side and the upper side. The supporting legs with adhering first set of display monitors are arranged to be movable along a first extension, the operator desk further comprising at least one light-emitting means and a central control device. The light-emitting means is comprised in a casing which is attached to the upper side with at least one mounting arm arranged to be adjustable, where the central control device is arranged to adjust the mounting arm such that the light-emitting means maintains a desired position along the first extension when the supporting legs with adhering first set of display monitors are moved along the first extension.

According to one example, the first extension runs perpendicularly to the longitudinal main extension, towards or away from a user.

According to another example, said mounting arm is arranged to be adjustable along the first extension.

According to another example, every desired position for the light-emitting means along the first extension allows the light-emitting means to project a light field onto the main work surface.

According to another example, the light-emitting means is comprised of an LED armature arranged to emit light in different colours.

Other embodiments of the present invention will be apparent from the dependent claims.

A number of advantages are achieved by means of the present invention, principally securing a flexible working environment with potential for continuous adjustment of various parameters, such as display monitor positioning, with retention of a good lighting environment, where a desired light field can be maintained.

BRIEF DESCRIPTION OF THE DRAWINGS

The present invention will now be described more in detail with reference to the accompanying figures, where.

DETAILED DESCRIPTION

Figure 1:
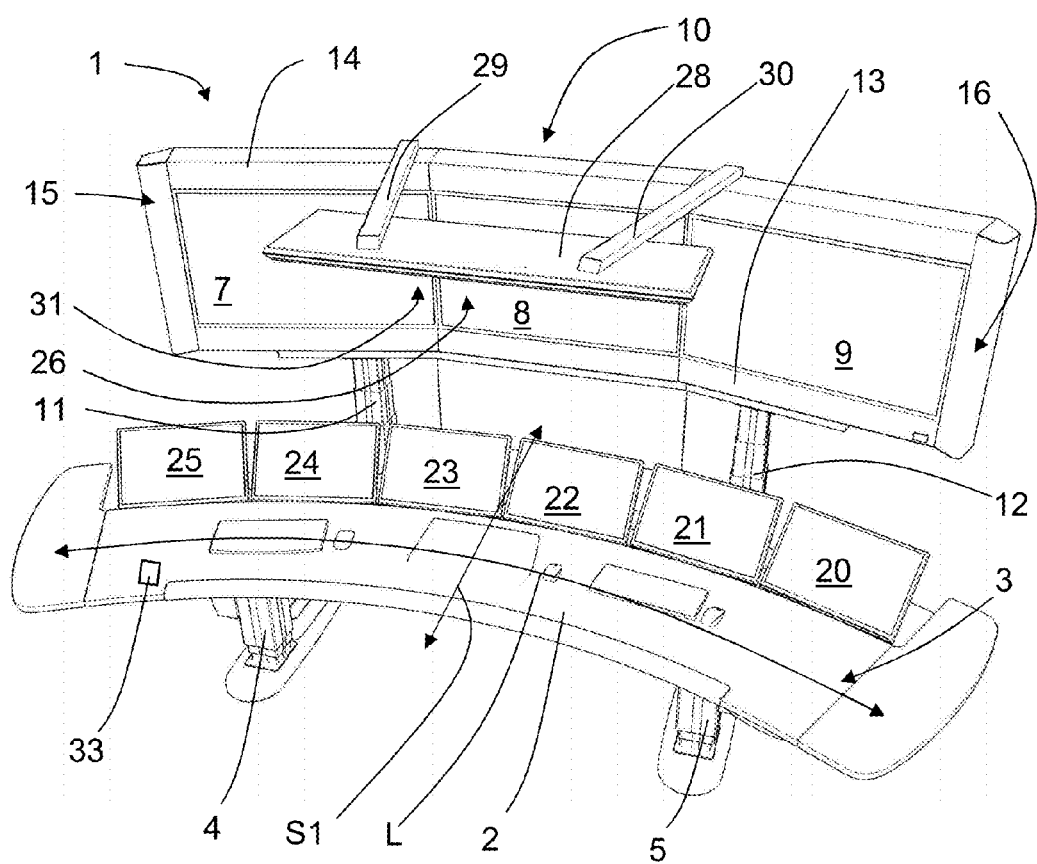
FIG. 1 shows a schematic perspective view of an operator desk seen diagonally from the front according to the present invention.
Figure 2:
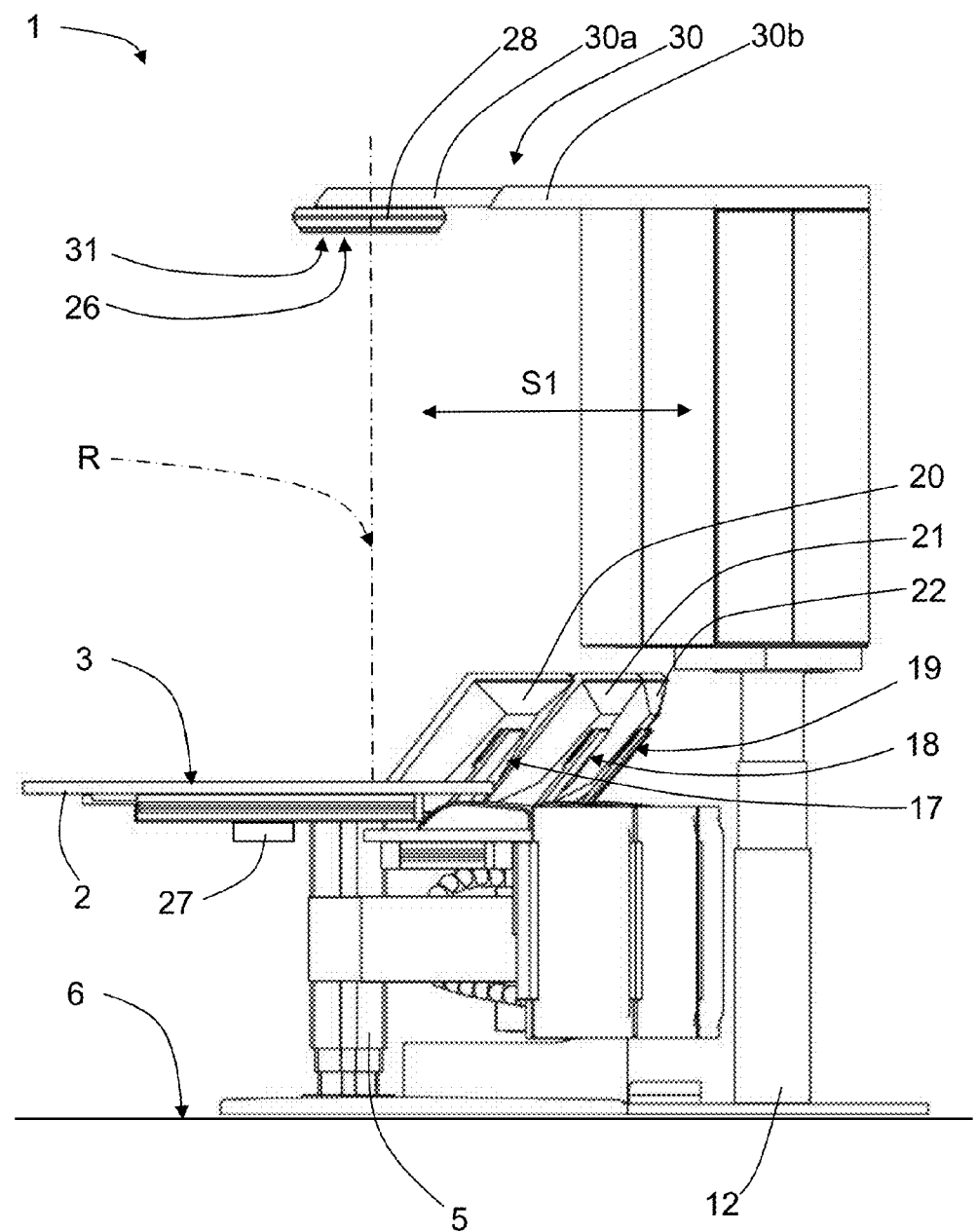
FIG. 2 shows a schematic side view of an operator desk according to the present invention in a first position.

An operator desk will now be described by way of example, with reference to FIG. 1 and FIG. 2, where FIG. 1 shows a schematic perspective view of an operator table diagonally from the front and FIG. 2 shows a schematic side view of an operator table according to the present invention.

An operator desk 1 comprises a work top 2 which has a main work surface 3 with a longitudinal main extension L, where the work top 2 is attached by at least two leg arrangements 4, 5 which extend between the desk top 2 and a base foundation 6 on which the operator desk is intended to be placed. The leg arrangements 4, 5 are electrically adjustable so that a first distance D1 between the base foundation 6 and the work top 2 can be changed.

The operator desk 1 comprises a first set of display monitors 7, 8, 9 of the overview type, placed above a second set of display monitors. The first set of monitors 7, 8, 9 is arranged on a display monitor mount 10 that is supported by two supporting legs 11, 12. The display monitor mount 10 has a lower side 13 that is facing towards the base foundation 6, an upper side 14 that is facing away from the base foundation 6, as well as connecting sides 15, 16 that connect the lower side 13 and the upper side 14. The supporting legs 11, 12 with adhering first set of display monitors 7, 8, 9 are arranged to be movable along a first extension S1, perpendicularly to the longitudinal main extension L, towards or away from a user. The supporting legs 11, 12 can also be vertically adjustable in the same way as the work top's leg arrangement 4, 5.

Figure 3:
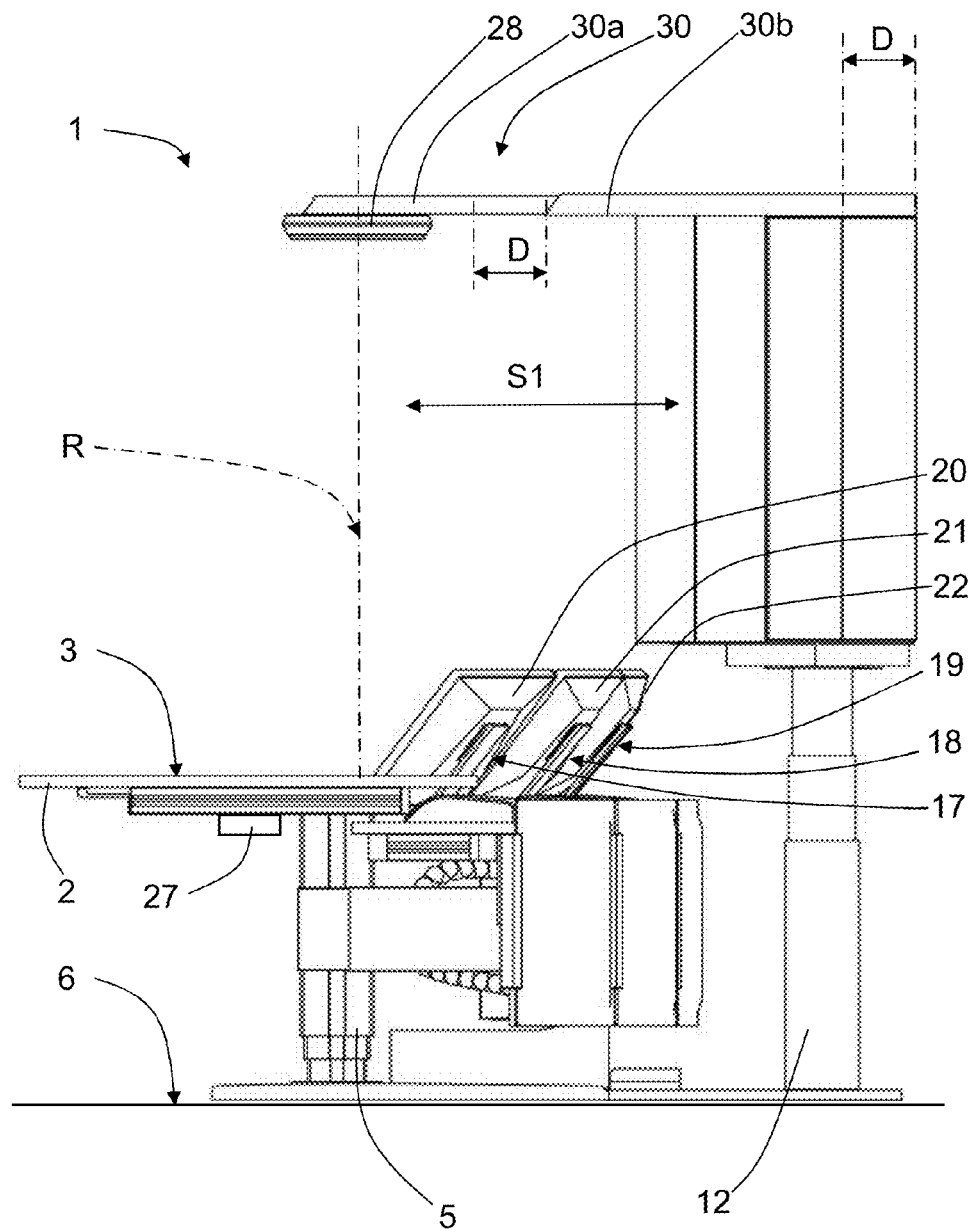
FIG. 3 shows a schematic side view of an operator desk according to the present invention in a second position.

The operator desk 1 further comprises a set of holder devices 17, 18, 19, where each holder device 17, 18, 19 is intended for a corresponding display monitor 20, 21, 22, 23, 24, 25 in the second set of display monitors. In FIG. 2 and FIG. 3 only three holder devices 17, 18, 19 are shown, but every display monitor 20, 21, 22, 23, 24, 25 in the second set of display monitors is attached to a corresponding holder device.

The operator desk further comprises a light-emitting means 26 and a central control device 27.

According to the present invention, the light-emitting means 26 is comprised in a casing 28 which is attached to the upper side 14 with two mounting arms 29, 30 arranged to be adjustable along the first extension S1, where the central control device 27 is arranged to adjust the mounting arms 29, 30 so that the light-emitting means 26 maintains a desired position along the first extension S1 when the supporting legs 11, 12 with adhering first set of display monitors 7, 8, 9 are moved along the first extension S1.

Every desired position for the light-emitting means 26 along the first extension S1 allows the light-emitting means 26 to project a light field on to the main work surface 3.

Figure 4:
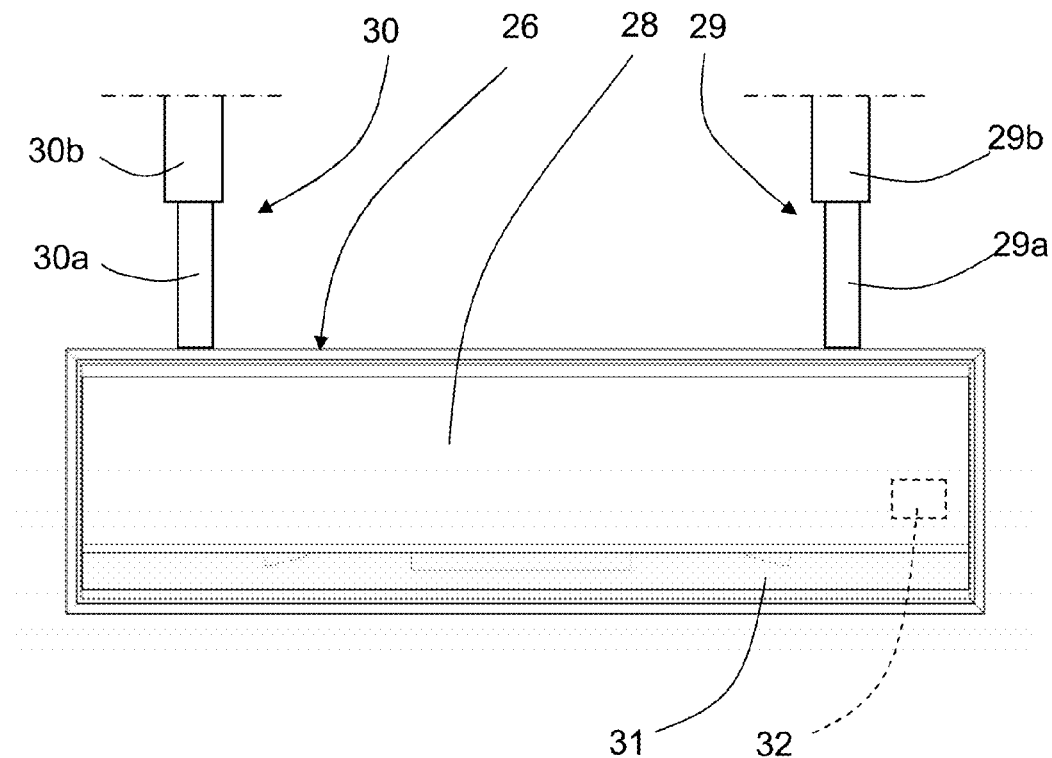
FIG. 4 shows a schematic view from underneath a casing with light- and sound-emitting means.

According to one embodiment of the present invention, with reference to FIG. 4, the casing 28 may further comprise a sound-emitting means 31, for example in the form of a loudspeaker element 31 of magnetostatic or electrostatic type, these being previously well-known types, as well as a first subcontroller device 32 which is arranged to control sound and light emissions. The casing 28 is intended to be placed so that an operator's head is vertically placed between the casing 28 and the operator desk 2. The light-emitting means 26, for example, can consist of an LED fitting that is arranged to be capable of emitting light in different colours.

The central control device 27 connected to an input device 33, shown in FIG. 1 and FIG. 5, for identification of every user, so that an initial adaptation of workstation parameters sound, light and display monitor setting can be performed for the user in question when this individual is identified via the input device 33. One embodiment of this initial adaptation is shown in FIG. 2.

Consequently, with the help of the present invention, can first casing 28, with the light-emitting means 26 and the loudspeaker element 31, as well as both sets of display monitors, take up a pre-defined desired position, whereupon a subsequent adjustment of the first set of display monitors can be performed without affecting the light field from the light-emitting means 26. This is made possible when the mounting arms describe an equivalent opposite movement when the first set of display monitors 7, 8, 9 describe a movement along the first extension S1. Consequently, with reference to FIG. 3 as well, if the operator gives a control command that causes the first set of display monitors 7, 8, 9 to move away from the operator a distance D along the first extension S1, the casing 28 with the light-emitting means 26 and the loudspeaker element 31 will simultaneously be moved the equivalent distance D in the opposite direction, whereupon the light field from the light-emitting means 26 will remain in the same place on the main work surface 3, which is symbolized with reference line R in FIG. 2 and FIG. 3.

In practical terms, this can be achieved by mounting arms 29, 30 being telescopically arranged as shown in FIG. 2, FIG. 3 and FIG. 4, with a respective first part 29a, 30a that can at least partly run inside a respective second part 29b, 30b. Alternatively, mounting arms 29, 30 can be adjustably attached to the casing 28, without telescopic function, which is illustrated in FIG. 1. The mounting arms 29, 30 can be arranged at an angle, as shown in FIG. 1, or arranged in parallel, as shown in FIG. 4.

The holder devices 17, 18, 19 for the second set of display monitors 20, 21, 22, 23, 24, 25 can also be moved and tilted in various ways so that they can also be adjusted for an initial adaptation as above, and can subsequently be altered as necessary.

All movements are made using electric motors that are controlled by the central control device 27, for example in response to commands entered into the input device 33.

According to a preferred example, changes can be programmed to occur automatically in order to achieve a higher level of wakefulness. After the initial adaptation, in this case the central control device 27 is set to execute relatively slow changes to the workstation parameters to maintain alertness and wakefulness. By way of example, a light-emitting means in the form of an LED fitting 26 can be commanded to initially emit a relatively warm light, which gives the workstation a welcoming quality. This gradually changes so the LED fitting 26 is commanded to emit a relatively colder light, which has a stimulating effect. Light temperature and current colour can be varied cyclically, where the cycles' characteristics can be adapted to the current user. The cycles can be identical or variable, with pauses, for example.

In the same way, the display monitor settings can gradually be altered, at different speeds and in different directions, for example. In the same way as the light, these gradual alterations can occur cyclically, where the cycles' characteristics can be adapted to the current user. The cycles can be identical or variable. A viewing angle suitable for the current user should preferably be maintained for each display monitor. When the first set of display monitors 7, 8, 9 is induced to move in this way, in this case an equivalent opposite movement of the light-emitting means 26 also occurs as described above, so that the light field from the light-emitting means 26 remains in the same place on the main work surface 3.

After the initial adaptation, which is preferably individual, the aforementioned alterations to the work station parameters to maintain alertness and wakefulness occur so slowly as to normally be imperceptible to a user.

The integration of sound and light within the casing 28 is advantageous to obtain maximal vision ergonomics and the best possible effect from sound emission. Both light and sound should be directed downwards towards the operator. In terms of sound ergonomics and vision ergonomics, experience shows that sound- and light-emitting means should occupy broadly the same position in order to provide the best effect. Moreover, the light should be directed so that it does not reflect onto the display monitors or into the eyes of the operator.

The loudspeaker element 31 should be directed so that the sound is not diffused in the control room in an undesirable way, but so that the sound as far as possible only reaches the current operator. It is desirable that both light 26 and sound source 31 are integrated on the smallest possible area without needing to be angled.

The present invention is not limited to the above but can vary freely within the scope of the subsequent patent claims. For example, the operator desk can comprise multiple sets of display monitors, where these sets can be separated vertically and comprise display monitors of different types and size, between and/or among themselves.

The operator desk 1 can have different extensions and configurations, where the main extension L is perpendicular to a user's line of sight towards a current display monitor, whereupon the main extension L can be curved when display monitors 20, 21, 22, 23, 24, 25 are mounted in a curve around the user, which is illustrated in FIG. 1, FIG. 4 and FIG. 5. The first extension S1 is shown running perpendicularly to the main extension L, but can also run at some other angle in relation to the main extension L, but the first extension S1 runs between a user and at least one display monitor.

Generally, definitions such as perpendicular should not be interpreted here as mathematically exact, but rather within the scope of what is practically feasible. Similarly, the determination that the light field from the light-emitting means 26 should remain focused on the same place on the main work surface 3 should not be interpreted to mean that the light field remains focused on exactly the same place, but small variations can arise due to sources of error, such as inconsistencies in means of control devices and motors. Preferably, the light field should appear to remain in the same place for an operator, when said sources of error do not give rise to a direct visual alteration of the light field when the first set of display monitors 7, 8, 9 is induced to move along the first extension S1. The light-emitting means 26 thus maintains a desired position along the first extension S1 within the scope discussed above.

While an operator desk may comprise more than two leg arrangements 4, 5, one single leg arrangement of a more robust design would also be possible.

Control devices 32, 27 and input devices 33 are of conventional type and communicate with each other and peripheral units, such as electric motors, in a previously well-known way.

It is obviously possible for an operator desk to comprise multiple loudspeaker panels with light-emitting means, for example if the operator desk is intended for multiple users. In an alternative embodiment, only light-emitting means are attached to the upper side.

While the number of mounting arms may vary, at least one mounting arm is required. The mounting arms 29, 30 do not need to be arranged to be adjustable along the first extension S1, but along any extension that allows the light-emitting means 26 to maintain a desired position along the first extension S1 when the supporting legs 11, 12 with adhering first set of display monitors 7, 8, 9 are moved along the first extension S1.

The connecting sides 15, 16 can comprise loudspeakers for general announcements.

The invention claimed is:

1. An operator desk comprising at least one work top which has one main work surface with a longitudinal main extension, where the work top is attached to at least one leg arrangement extending between the work-top and a base foundation on which the operator desk is intended to be placed, the operator desk further comprising at least one first set of display monitors, where the first set of display monitors is arranged on a display monitor mount which is supported by at least two supporting legs and has a lower side that is facing towards the base foundation an upper side that is facing away from the base foundation as well as connecting sides that connect the lower side and the upper side, where said supporting legs with adhering first set of display monitors are arranged to be movable along a first extension, the operator desk further comprising at least one light-emitting means and one central control device, characterized by the light-emitting means being comprised in a casing which is attached to the display monitor mount's upper side with at least one mounting arm arranged to be adjustable, where the central control device is arranged to extend said mounting arm independently of movement of the first set of display monitors, such that the light-emitting means maintains a desired position along the first extension when the supporting legs with adhering first set of display monitors is moved along the first extension.

2. An operator desk according to claim 1, characterized by the first extension running perpendicularly to the longitudinal extension, towards or away from a user.

3. An operator desk according to claim 1, characterized by said mounting arm being arranged to be adjustable along the first extension.

4. An operator desk according to claim 1, characterized by each desired position for the light-emitting means along the first extension allowing the light-emitting means to project a light field on the main work surface.

5. An operator desk according to claim 1, characterized by the central control unit being connected to an input device for identification of each user and being arranged, after an identification of a user, to control an initial adaptation of at least one of the workstation parameters sound, light and display monitor setting.

6. An operator desk according to claim 5, characterized by the central control device also being arranged, at a preset time after the initial adaptation, to control an alteration of said workstation parameters.

7. An operator desk according to claim 6, characterized by the central control unit being arranged to alter said workstation parameters continuously between a number of different states in response to a variable pattern during at least one preset time period.

8. An operator desk according to claim 1, characterized by one sound-emitting means being contained in the casing.

9. An operator desk according to claim 8, characterized by at least one subcontroller device being contained in the casing and being arranged to control both sound emission and light emission, so that sound emission and light emission are reciprocally synchronized.

10. An operator desk according to claim 1, characterized by the light-emitting means consisting of an LED fitting that is arranged to emit light in different colours.

11. An operator desk according to claim 1, characterized by the operator desk comprising at least one holder device intended for a respective display monitor in a second set of display monitors, where the first set of display monitors of the overview type, placed above the second set of display monitors.

12. An operator desk according to claim 11, characterized by each holder device being arranged to be movable along at least one extension, where said movement is controlled by the central control device.

13. An operator desk according to claim 2, characterized by said mounting arm being arranged to be adjustable along the first extension.

* * * * *